United States Patent
Matsumura et al.

(10) Patent No.: US 12,101,771 B2
(45) Date of Patent: Sep. 24, 2024

(54) TERMINAL AND RADIO COMMUNICATION METHOD FOR SUPPRESSING DETERIORATION OF COMMUNICATION QUALITY

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 335 days.

(21) Appl. No.: 17/627,438

(22) PCT Filed: Jul. 18, 2019

(86) PCT No.: PCT/JP2019/028315
§ 371 (c)(1),
(2) Date: Jan. 14, 2022

(87) PCT Pub. No.: WO2021/009916
PCT Pub. Date: Jan. 21, 2021

(65) Prior Publication Data
US 2022/0272736 A1    Aug. 25, 2022

(51) Int. Cl.
*H04W 72/12* (2023.01)
*H04L 1/08* (2006.01)
*H04L 5/00* (2006.01)
*H04W 72/20* (2023.01)

(52) U.S. Cl.
CPC ............ *H04W 72/20* (2023.01); *H04L 1/08* (2013.01); *H04L 5/0035* (2013.01)

(58) Field of Classification Search
CPC ... H04W 72/20; H04W 8/20; H04W 36/0072; H04W 52/02; H04W 52/0209; H04W 56/001; H04W 56/0015; H04W 56/00355; H04L 1/08; H04L 5/0055; H04L 1/0013; H04L 1/0067
See application file for complete search history.

(56) References Cited

U.S. PATENT DOCUMENTS

| 2019/0239212 A1* | 8/2019 | Wang | H04L 5/0051 |
| 2020/0137741 A1* | 4/2020 | Zhou | H04W 24/08 |
| 2020/0154489 A1* | 5/2020 | Zhou | H04W 56/001 |
| 2020/0351926 A1* | 11/2020 | Bagheri | H04W 72/21 |

(Continued)

OTHER PUBLICATIONS

"On multi-TRP and multi-panel" Athens, Greece; Feb. 25, 2019 (Year: 2019).*

(Continued)

*Primary Examiner* — Mewale A Ambaye
(74) *Attorney, Agent, or Firm* — Osha Bergman Watanabe & Burton LLP

(57) ABSTRACT

A terminal according to one aspect of the present disclosure includes a receiving section that receives a plurality of pieces of first control information to indicate activation of TCI states respectively corresponding to transmission and reception points and second control information to designate a specific TCI state from activated TCI states, and a control section that determines, based on a value of a specific field included in the first control information, a transmission and reception point to which a TCI state to be activated corresponds.

7 Claims, 11 Drawing Sheets

(56) References Cited

U.S. PATENT DOCUMENTS

2021/0368457 A1* 11/2021 Chen ............... H04L 5/0035
2022/0256612 A1* 8/2022 MolavianJazi ... H04W 74/0833

OTHER PUBLICATIONS

Ericsson; "On multi-TRP and multi-panel"; 3GPP TSG RAN WG1 Meeting #96, R1-1902540; Athens, Greece; Feb. 25-Mar. 1, 2019 (11 pages).
ZTE; "Enhancements on multi-TRP/Panel transmission"; 3GPP TSG RAN WG1 #96, R1-1901634; Athens, Greece; Feb. 25-Mar. 1, 2019 (19 pages).
Huawei et al.; "Summary of AI: 7.2.8.2 Enhancements on Multi-TRP/Panel Transmission of Offline Discussion"; 3GPP TSG RAN WG1 Meeting #97, R1-1907706; Reno, USA; May 13-17, 2019 (66 pages).
Extended European Search Report issued in European Application No. 19937428.1, dated Mar. 13, 2023 (10 pages).
International Search Report issued in PCT/JP2019/028315 on Aug. 27, 2019 (2 pages).
Written Opinion of the International Searching Authority issued in PCT/JP2019/028315 on Aug. 27, 2019 (5 pages).
MediaTek Inc.; "Support multi-TRP/panel transmission"; 3GPP TSG-RAN WG2 Meeting #106, R2-1908071; Reno, USA; May 13-17, 2019 (6 pages).
Samsung; "MAC CE design for support of multiple beam indication for multiple TRPs"; 3GPP TSG-RAN2 Meeting #105bis, R2-1904756; Xi'an, China; Apr. 8-12, 2019 (7 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Japanese Application No. 2021-532652, dated Aug. 22, 2023 (9 pages).

* cited by examiner

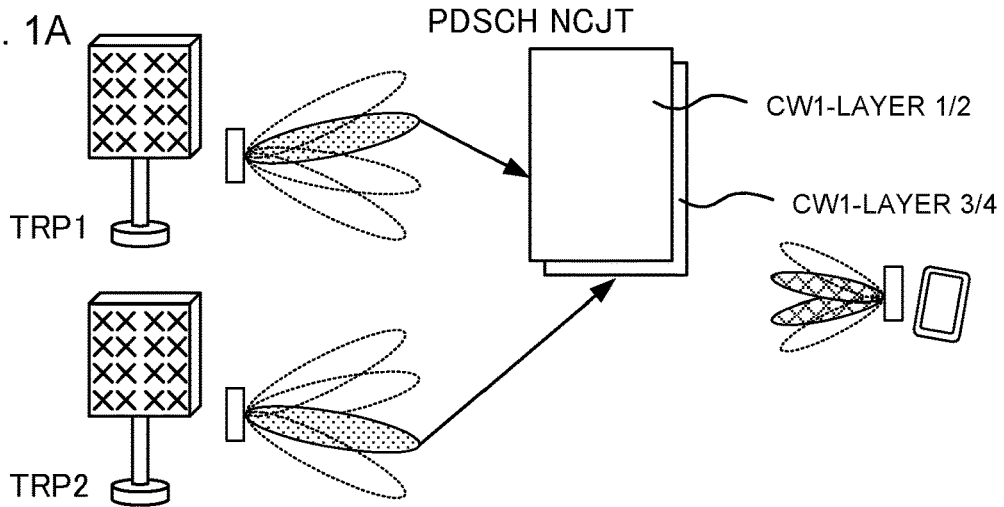
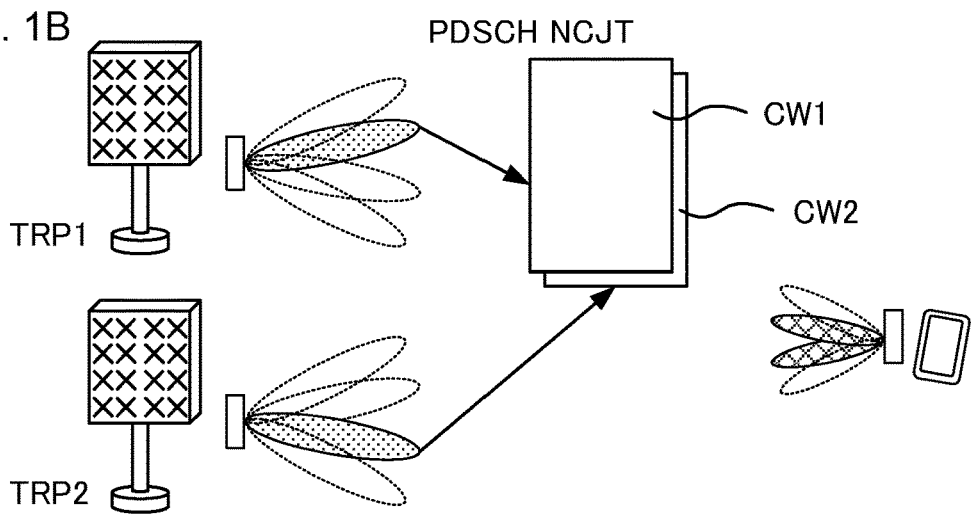
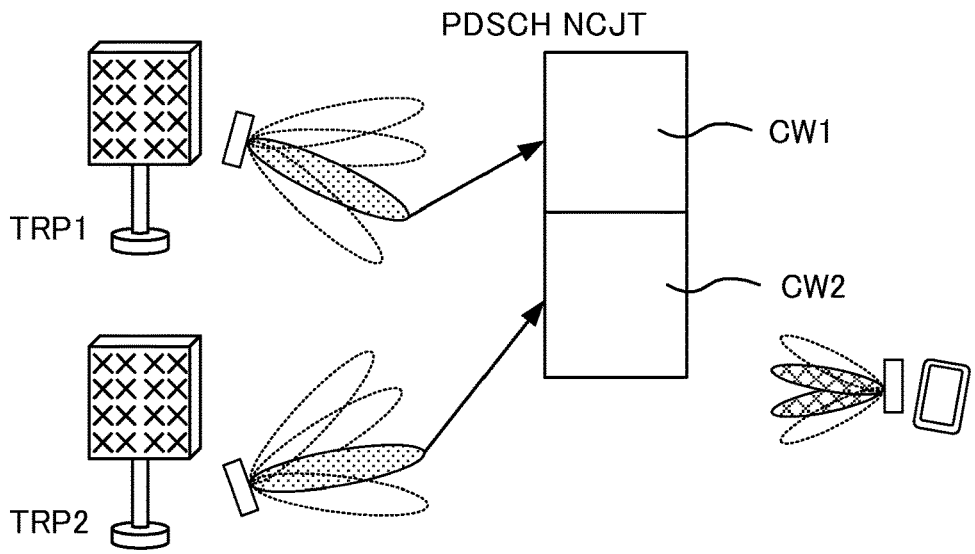

FIG. 2A

| T0 | TCI STATE 1 |
|---|---|
| T1 | TCI STATE 2 |
| T2 | TCI STATE 3 |
| T3 | TCI STATE 4 |
| T4 | TCI STATE 5 |
| T5 | TCI STATE 6 |
| ... | ... |

FIG. 2B

| R | SERVING CELL ID | | | | | | BWP ID |
|---|---|---|---|---|---|---|---|
| T7 | T6 | T5 | T4 | T3 | T2 | T1 | T0 |
| T15 | T14 | T13 | T12 | T11 | T10 | T9 | T8 |
| ... | ... | ... | ... | ... | ... | ... | ... |
| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ |

FIG. 2C

| TCI CODE POINT | TCI STATE |
|---|---|
| 000 | T0 (TRP#0) |
| 001 | T1 (TRP#0) |
| 010 | T2 (TRP#0) |
| 011 | T5 (TRP#0) |
| 100 | T8 (TRP#0) |
| 101 | T1 (TRP#1) |
| 110 | T6 (TRP#1) |
| 111 | T10 (TRP#1) |

FIG. 3A

| R=0 | SERVING CELL ID | | | | | | BWP ID |
|---|---|---|---|---|---|---|---|
| T7 | T6 | T5 | T4 | T3 | T2 | T1 | T0 |
| T15 | T14 | T13 | T12 | T11 | T10 | T9 | T8 |
| T23 | T22 | T21 | T20 | T19 | T18 | T17 | T16 |
| ... | ... | ... | ... | ... | ... | ... | ... |

FIG. 3B

| R=1 | SERVING CELL ID | | | | | | BWP ID |
|---|---|---|---|---|---|---|---|
| T7 | T6 | T5 | T4 | T3 | T2 | T1 | T0 |
| T15 | T14 | T13 | T12 | T11 | T10 | T9 | T8 |
| T23 | T22 | T21 | T20 | T19 | T18 | T17 | T16 |
| ... | ... | ... | ... | ... | ... | ... | ... |

FIG. 4A

| TCI CODE POINT | TCI STATE |
|---|---|
| 000 | T0 (TCI#0)<br>T0 (TCI#1) |
| 001 | T1 (TCI#0)<br>T2 (TCI#1) |
| 010 | T5 (TCI#0)<br>T4 (TCI#1) |
| 011 | T8 (TCI#0)<br>T7 (TCI#1) |
| 100 | T10 (TCI#0)<br>T10 (TCI#1) |
| 101 | T12 (TCI#0)<br>T14 (TCI#1) |
| 110 | T15 (TCI#0)<br>T17 (TCI#1) |
| 111 | T20 (TCI#0)<br>T20 (TCI#1) |

FIG. 4B

| TCI CODE POINT | TCI STATE |
|---|---|
| 000 | T0 (TCI#0)<br>T0 (TCI#1) |
| 001 | T1 (TCI#0) |
| 010 | T4 (TCI#1) |
| 011 | T8 (TCI#0) |
| 100 | T10 (TCI#0) |
| 101 | T14 (TCI#1) |
| 110 | T17 (TCI#1) |
| 111 | T20 (TCI#0)<br>T22 (TCI#1) |

| R | SERVING CELL ID | BWP ID |
|---|---|---|
| C_1,0 | TCI STATE_1,0 (TRP#0) | |
| C_1,1 | TCI STATE_1,1 (TRP#1) | |
| C_2,0 | TCI STATE_2,0 (TRP#0) | |
| C_2,1 | TCI STATE_2,1 (TRP#1) | |
| ... | ... | |
| C_i,0 | TCI STATE_i,0 (TRP#0) | |
| C_i,1 | TCI STATE_i,1 (TRP#1) | |
| ... | ... | |
| C_N,0 | TCI STATE_N,0 (TRP#0) | |
| C_N,1 | TCI STATE_N,1 (TRP#1) | |

FIG. 5

| R | SERVING CELL ID | BWP ID |
|---|---|---|
| C_1,0 | TCI STATE_1,0 (first TRP) | |
| C_1,1 | TCI STATE_1,1 (second TRP) | |
| C_2,0 | TCI STATE_2,0 (first TRP) | |
| C_2,1 | TCI STATE_2,1 (second TRP) | |
| ... | ... | |
| C_i,0 | TCI STATE_i,0 (first TRP) | |
| C_i,1 | TCI STATE_i,1 (second TRP) | |
| ... | ... | |
| C_N,0 | TCI STATE_N,0 (first TRP) | |
| C_N,1 | TCI STATE_N,1 (second TRP) | |

FIG. 6

| R | SERVING CELL ID | BWP ID |
|---|---|---|
| C | TCI STATE_1,0 (first) | |
| R | TCI STATE_1,1 (second) | |
| ... | ... | |
| C | TCI STATE_i,0 (first) | |
| R | TCI STATE_i,1 (second) | |
| ... | ... | |
| C | TCI STATE_N,0 (first) | |
| R | TCI STATE_N,1 (second) | |

FIG. 7

TERMINAL AND RADIO COMMUNICATION METHOD FOR SUPPRESSING DETERIORATION OF COMMUNICATION QUALITY

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

In existing LTE systems (e.g., LTE Rel. 8 to Rel. 13), a user terminal (UE (User Equipment)) controls reception of a downlink shared channel (e.g., a Physical Downlink Shared Channel (PDSCH)) based on downlink control information (DCI, also referred to as DL assignment, and so on) from a radio base station. The UE controls transmission of an uplink shared channel (e.g., a Physical Uplink Shared Channel (PUSCH)) based on the DCI (also referred to as a UL grant and so on).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (e.g., NR, 5G, 5G+, or Rel. 16 (or later versions)), communication using beam forming (BF) is under study. For improvement in quality of communication using BF, controlling at least one of transmission and reception of a signal in consideration of a quasi-co-location (QCL) relationship (QCL relationship) between a plurality of signals is under study.

In the future radio communication systems, it is assumed that DL signals (e.g., PDSCHs) are transmitted from a plurality of transmission and reception points or a plurality of panels. In this case, it is conceivable that scheduling of the PDSCHs transmitted from the plurality of the transmission and reception points is controlled with use of one or a plurality of pieces of downlink control information (or PDSCHs).

However, how the PDSCH receiving process and the like are controlled is an issue when scheduling of the PDSCHs and the like transmitted from the plurality of the transmission and reception points is controlled with use of certain DCI (e.g., one piece of DCI). For example, in the receiving process, a UE needs to perform at least one of a rate matching process, determination of quasi co-location (QCL), and determination of PDSCH assignment resources, but the receiving process is not fully studied in a concrete manner. Unless the receiving process is performed appropriately, quality of communication using the plurality of the transmission and reception points may deteriorate.

The present disclosure has been made in view of the above-described respects, and an object of the present disclosure is to provide a terminal and a radio communication method that can suppress deterioration of communication quality even when communication is performed by using a plurality of transmission and reception points.

Solution to Problem

A terminal according to one aspect of the present disclosure includes a receiving section that receives a plurality of pieces of first control information to indicate activation of TCI states respectively corresponding to transmission and reception points and second control information to designate a specific TCI state from activated TCI states, and a control section that determines, based on a value of a specific field included in the first control information, a transmission and reception point to which a TCI state to be activated corresponds.

Advantageous Effects of Invention

According to one aspect of the present disclosure, it is possible to suppress deterioration of communication quality even when communication is performed by using a plurality of transmission and reception points.

BRIEF DESCRIPTION OF DRAWINGS

FIGS. 1A to 1C are diagrams to show an example of a case where PDSCHs are transmitted from one or more TRP points;

FIGS. 2A to 2C are diagrams to show an example of a method for notifying information related to TCI states;

FIGS. 3A and 3B are diagrams to show an example related to TCI states to be designated by MAC control information;

FIGS. 4A and 4B are diagrams to show an example of TCI states to be configured for DCI code points;

FIG. 5 is a diagram to show another example related to TCI states to be designated by MAC control information;

FIG. 6 is a diagram to show another example related to the TCI states to be designated by the MAC control information;

FIG. 7 is a diagram to show another example related to the TCI states to be designated by the MAC control information;

DESCRIPTION OF EMBODIMENTS

Figure 8:
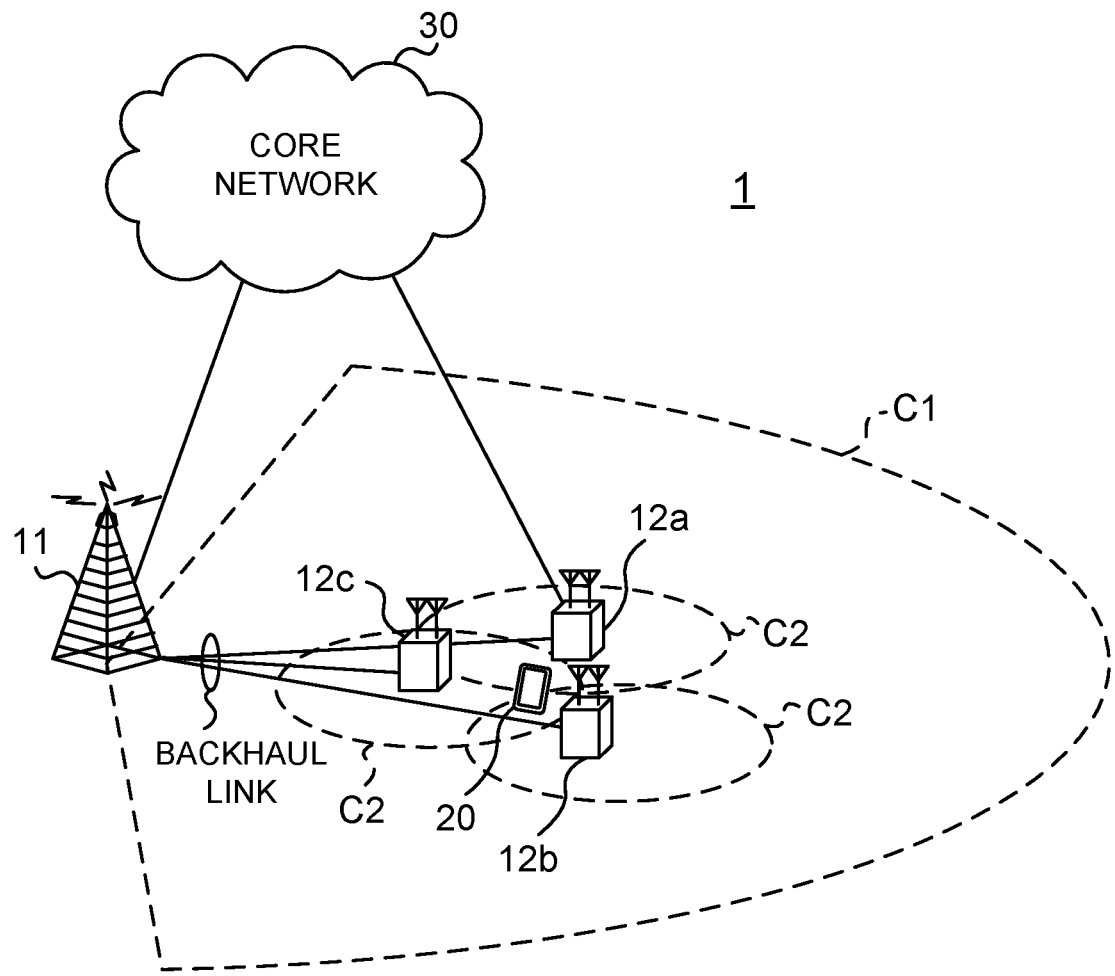
FIG. 8 is a diagram to show an example of a schematic structure of a radio communication system according to one embodiment.

For future radio communication systems, it is studied that each non-coherent DL (e.g., PDSCH) transmission is performed from a plurality of transmission and reception points (TRPs). Transmission performed by coordinating a non-coherent DL signal (or DL channel) from the plurality of the TRPs may be referred to as NCJT (Non-Coherent Joint Transmission). In the present description, a transmission and reception point (TRP) may be interpreted as a transmission point, a reception point, a panel, or a cell.

It is also assumed that scheduling of non-coherent PDSCHs transmitted from a plurality of TRPs is controlled with use of certain DCI (e.g., a single piece of DCI).

In this case, it is conceivable that PDSCHs respectively transmitted from different TRPs are transmitted by being mapped to the same resources (e.g., time and frequency resources). For example, a structure (see FIG. 1A) in which PDSCHs corresponding to the same codeword (CW) are transmitted by different layers or a structure (see FIG. 1B) in which PDSCHs corresponding to different CWs are transmitted may be supported. Note that the CW may be interpreted as a transport block (TB).

FIG. 1A shows a case where a PDSCH (corresponding to CW #1) transmitted from a first TRP uses at least one of layers 1 and 2 and a PDSCH (corresponding to CW #1) transmitted from a second TRP uses at least one of layers 3 and 4 to be mapped to the same time and frequency resources.

FIG. 1B shows a case where a PDSCH (corresponding to CW #1) transmitted from a first TRP and a PDSCH (corresponding to CW #2) transmitted from a second TRP are mapped to the same time and frequency resources. Note that the PDSCH transmitted from the first TRP and the PDSCH transmitted from the second TRP may be mapped to resources with at least one of different time and frequency.

However, when PDSCHs transmitted from a plurality of TRPs with use of single piece of DCI are scheduled, how quasi-co-location (QCL) notification, rate matching notification, or the like in a process for receiving the PDSCH is controlled is an issue.

It is also conceivable that PDSCHs respectively transmitted from different TRPs are transmitted by being assigned to different resources (e.g., resources being different in terms of at least one of time and frequency resources) (see FIG. 1C). FIG. 1C shows a case where a PDSCH (corresponding to CW #1) transmitted from a first TRP and a PDSCH (corresponding to CW #2) transmitted from a second TRP are mapped to different time and frequency resources.

However, when PDSCHs transmitted from a plurality of TRPs with use of a PDCCH (e.g., a single PDCCH) or DCI (e.g., single piece of DCI) common to the plurality of the TRPs are scheduled, how a process for receiving a PDSCH (e.g., a corresponding TCI state) from each TRP is controlled is an issue.

The inventors of the present invention studied, in a case where activation (or mapping to a DCI code point) of a TCI state is indicated by MAC control information, a method for notifying a TRP corresponding to the TCI state, and came up with the idea of the present invention.

In the following descriptions, a TRP may be interpreted as at least one of a DMRS group, a DMRS port group, a panel, and a CDM group. A TCI state may also be interpreted as quasi co-location (QCL).

(QCL for PDSCH)

Quasi co-location (QCL) is an indicator indicating statistical properties of the channel. For example, when a certain signal/channel and another signal are in a relationship of QCL, it is indicated that it is assumable that at least one of Doppler shift, a Doppler spread, an average delay, a delay spread, and a spatial parameter (for example, a spatial reception parameter (spatial Rx parameter)) is the same between such a plurality of different signals.

One or more different types (QCL types) as parameters or parameter sets that can be assumed to be the same may be provided for the QCL. For example, four QCL types A to D in which parameters that can be assumed to be the same are different from each other may be provided.

QCL type A: QCL in which Doppler shift, Doppler spread, average delay, and delay spread can be assumed to be the same QCL type B: QCL in which Doppler shift and Doppler spread can be assumed to be the same QCL type C: QCL in which average delay and Doppler shift can be assumed to be the same QCL type D: QCL in which spatial reception parameters can be assumed to be the same A transmission configuration indicator (Transmission Configuration Indicator state (TCI-state)) may indicate (include) information (also referred to as QCL information, QCL information for the PDSCH, or the like) related to QCL for the PDSCH. The QCL information for the PDSCH is, for example, information related to QCL between the PDSCH (or a DMRS port for the PDSCH) and a downlink reference signal (DL-RS), and may include, for example, at least one of information (DL-RS-related information) related to the DL-RS being in a QCL relationship and information (QCL type information) indicating the above-described QCL types.

Here, the DMRS port is an antenna port for a demodulation reference signal (DMRS). The DMRS port may be a DMRS port group including a plurality of DMRS ports, and the DMRS port of the present description may be interpreted as the DMRS port group.

The DL-RS-related information may include at least one of information indicating a DL-RS being in a QCL relationship and information indicating a resource for the DL-RS. For example, when a plurality of reference signal sets (RS sets) are configured for a UE, the DL-RS-related information may indicate a certain DL-RS being in a QCL relationship with a PDSCH (or a DMRS port for the PDSCH) out of reference signals included in the RS sets and a resource for the DL-RS.

Here, the DL-RS may be at least one of a synchronization signal (e.g., at least one of a primary synchronization signal (PSS) and a secondary synchronization signal SSS)), a mobility reference signal (Mobility RS (MRS)), a synchronization signal block (SSB), a channel state information reference signal (Channel State Information-Reference Signal (CSI-RS)), a demodulation reference signal (DMRS), a broadcast channel (Physical Broadcast Channel (PBCH)), a beam-specific signal, and the like, or may be a signal (e.g., a signal constituted by changing density and/or periodicity) constituted by expanding and/or changing these signals.

As described above, each TCI state can indicate (can include) the QCL information for the PDSCH. One or more TCI states (one or more pieces of QCL information for the PDSCH) may be notified (configured) from a radio base station to the UE by higher layer signaling (e.g., RRC signaling). Note that the number of TCI states configured for the UE may be limited depending on the QCL types.

DCI (DL assignment) used for scheduling of the PDSCH may include a certain field (field for TCI state notification) indicating a TCI state (QCL information for the PDSCH). The field for TCI state notification may be constituted by a certain number of bits (e.g., any one of 1 to 3 bits). Whether the TCI state field is included in the DCI may be controlled by notification (e.g., higher layer signaling) from the radio base station.

For example, when the DCI includes a 3-bits field for TCI state notification, the radio base station may preconfigure at most 8 types of TCI states for the UE by the higher layer signaling. A value of the TCI state field (TCI state field value) in the DCI may indicate one of the TCI states preconfigured by the higher layer signaling.

When TCI states exceeding a certain number (e.g., 8) are configured for the UE, TCI states equal to or less than the certain number may be activated (or designated) by a certain signal (e.g., a MAC control element (Medium Access Control Control Element (MAC CE))). The value of the field for TCI state notification in the DCI may indicate one of the TCI states activated by the MAC CE (also hereinafter described as MAC control information). Note that the number of TCI states that can be designated by the DCI is not limited to 8 types (e.g., 3 bits), and the TCI states may be notified with use of 4 or more bits.

The UE determines QCL for the PDSCH (or a DMRS port for the PDSCH) based on the TCI states (QCL information for the PDSCH) indicated by the DCI. For example, the UE controls a PDSCH receiving process (e.g., a decoding process, a demodulating process, and/or the like) with an assumption that a DMRS port (or a DMRS port group) for the PDSCH in a serving cell is QCL with a DL-RS corresponding to the TCI states notified by the DCI. Therefore, precision of reception of the PDSCH can be improved.

The present embodiment will be described in detail hereinafter with reference to the drawings. Note that a case where a TCI state is used for PDSCH demodulation on the basis of the TCI state will be described in descriptions below, but the present embodiment is not limited to this. The present embodiment can be employed in procedure using the TCI state (e.g., a process for receiving another signal or channel). The present embodiment may be employed in a process for transmitting a UL signal (e.g., a PUSCH).

In descriptions below, QCL may be interpreted as spatially QCL (spatially quasi co-located). When a PDSCH is transmitted from one transmission and reception point, the present embodiment may include transmission from a coordinated cell.

Information related to the TCI state will be described in descriptions below, but the information related to the TCI state may be interpreted as information related to rate matching (RM) or information related to quasi co-location.

Aspects of the present embodiment below can be employed in any communication systems using a plurality of TRPs. For example, the aspects may be employed in a structure (NCJT) in which non-coherent (non-coherent transmission) DL signals (e.g., CWs or TBs) are cooperatively transmitted from a plurality of TRPs or a structure in which one DL signal (e.g., a CW or a TB) is repetitively transmitted (repetition transmission) from each TRP. Note that the present embodiment is not limited to a case where the DL signal from the plurality of the TRPs is non-coherent.

The structure in which one CW/TB is repetitively transmitted (repetition transmission) from each TRP may be any one of a method (time division multiplexing (TDM)) for repetitively transmitting one CW or TB from each TRP by using temporally different symbols or slots, a method (frequency division multiplexing (FDM)) for repetitively transmitting one CW or TB from each TRP in the same time domain (e.g., symbol) by using different frequency resources, and (spatial division multiplexing (SDM)) for repetitively transmitting one CW or TB from each TRP in the same time domain (e.g., symbol) by using the same frequency resource.

(First Aspect)

In a first aspect, information related to TCI states corresponding to one or a plurality of TRPs is notified to a UE with use of a certain PDCCH (e.g., a single PDCCH), certain DCI (e.g., single DCI), or the like to schedule data (e.g., a PDSCH or a DL-SCH) from one or more TRPs. TCI state candidates for respective TRPs are activated with use of a plurality of pieces of MAC control information. Note that descriptions below describes a case where the number of TRPs to transmit a DL signal to the UE is equal to or less than 2 as an example, but the number of the TRPs is not limited to this, and may be 3 or more.

<Set Configuration by Higher Layer>

A network (e.g., a base station) may configure one or more TCI configuration (or TCI state) candidates for the UE. FIG. 2A shows an example of TCI state candidates configured for the UE by using higher layer signaling. The TCI state candidates may be configured as a TCI state index.

The base station may configure a certain number of TCI states (e.g., TCI state indices) by using the higher layer signaling. Here, a case where $T_0$ to $T_{(N-2)\times 8+7}$ as the TCI states are configured is shown.

The base station may configure TCI state indices common to a plurality of TRPs. Therefore, an increase in amount of information about the higher layer signaling notified from the base station to the UE can be suppressed. Alternatively, the base station may separately (e.g., differently) configure TCI state indices for each of the plurality of the TRPs. Therefore, it is possible to flexibly perform a TCI state configuration for each TRP.

<Activation Indication by MAC CE>

When the number of candidates for one or more TCI states configured by higher layer signaling is more than a certain value (e.g., 8), the base station may designate TCI state candidates for activation (or mapping to a code point for a certain field in DCI) for the UE by using MAC control information (see FIG. 2B). In other words, the UE may determine the TCI state candidates activated based on the MAC control information transmitted from the base station. Note that the activation may be interpreted as at least one of activation and deactivation, or deactivation.

The activated TCI state candidates may be configured (or mapped) in a code point for a certain bit field included in the DCI. The certain bit field may be, for example, a bit field for TCI state notification. Mapping to each code point may be controlled in TCI state index order.

The activation of the TCI state candidates may be separately (e.g., differently) controlled for each TRP. For example, a structure in which at least one of indices and the number of TCI states activated by MAC control information corresponding to each TRP is independently configured for each TRP may be allowed.

For example, the base station may notify corresponding MAC control information to each TRP. When the number of TRPs is 2 (e.g., TRP #0 and TRP #1), the base station may transmit two pieces of MAC control information (MAC control information corresponding to TRP #0 and MAC control information corresponding to TRP #1) to the UE.

The UE may determine, based on a bit value of a certain field included in MAC control information, a TRP to which the TCI state activated by the MAC control information corresponds. The certain field may be, for example, a reserved bit. For example, in a first octet (Oct 1), information related to the TRP may be notified to the UE with use of a bit (reserved bit (R)) other than bits used for a serving ID and a BWP ID.

FIG. 3 shows an example of TCI states activated by first MAC control information (in which a certain bit is 0) corresponding to a first TRP and TCI states activated by second MAC control information (in which a certain bit is 1) corresponding to a second TRP. Here, a case where TCI states #0, #1, #2, #5, and #8 are activated by the first MAC control information is shown (see FIG. 3A). A case where TCI states #1, #6, and #10 are activated by the second MAC control information is shown (see FIG. 3B).

The number of candidates for the TCI states activated by the first MAC control information and the number of candidates for the TCI states activated by the second MAC control information may be different from each other. A sum value or a maximum value of the number of candidates for the TCI states activated by the first MAC control information and the number of candidates for the TCI states activated by the second MAC control information may be configured such that the sum value or the maximum value is equal to or less than a certain value (e.g., 8).

An activated TCI state (e.g., TCI state index) may be mapped to a DCI code point based on at least one of the TCI state index and TRP index.

In cases shown in FIG. 3A and FIG. 3B, the UE may map the activated TCI states corresponding to the first TRP to the DCI code point in index order, and subsequently map the activated TCI states corresponding to the second TRP to the DCI code point in index order (see. FIG. 2C). Here, a case where the TCI states are mapped to the DCI code point in order from a TCI state corresponding to a TRP with a smaller index (or a bit value in the certain field being 0) is shown, but the mapping order is not limited to this.

Alternatively, the activated TCI states corresponding to the first TRP and the activated TCI states corresponding to the second TRP may be mapped to the same DCI code point. For example, a certain number of TCI states corresponding to the first TRP and a certain number of TCI states corresponding to the second TRP may be activated, and may be mapped to DCI code points for each TRP (see FIG. 4A). In this case, TCI states (TCI state sets) for a plurality of TRPs are mapped to each code point of the DCI.

TCI states corresponding to the plurality of the TRPs may be mapped to some code points out of the DCI code points, and TCI states corresponding to either the first TRP or the second TRP may be mapped to the rest of the code points (see FIG. 4B). Therefore, it is possible to appropriately configure the TCI states even in a case of scheduling in one TRP of the plurality of the TRPs.

<ICI State Designation by DCI>

The base station may notify the UE of specific TCI state candidates by using DCI. For example, the UE determines, based on a code point notified by a certain field included in the DCI, TCI states notified from the base station (or each TRP). FIG. 2C shows an example in which the certain field is 3 bits, but the number of bits of the certain field is not limited to this. It is only necessary that the UE performs, based on the notified TCI states, a process for receiving a PDSCH transmitted from each TRP.

The UE may determine, based on correspondence between TCI states and DCI code points activated by MAC control information, at least one of an TRP index at which the PDSCH is transmitted and the number of TRPs in which the PDSCH is transmitted. For example, when one TCI state corresponds to a code point designated by the DCI, the UE may determine that a PDSCH is transmitted from one TRP.

On the other hand, when two TCI states correspond to a code point designated by the DCI, the UE may determine that PDSCHs are transmitted from two TRPs.

As described above, TCI states to be activated for each TRP with use of a plurality of pieces of MAC control information are controlled, and thus it is possible to appropriately configure TCI states for each TRP even when one PDCCH (or DCI) is transmitted from a plurality of TRPs.

(Second Aspect)

In a second aspect, a case where TCI state candidates respectively corresponding to a plurality of TRPs are activated with use of one piece of MAC control information will be described. Note that descriptions below describes a case where the number of TRPs to transmit a DL signal to the UE is equal to or less than 2 as an example, but the number of the TRPs is not limited to this, and may be 3 or more.

<Set Configuration by Higher Layer>

A network (e.g., a base station) may configure one or more TCI configuration (or TCI state) candidates (or TCI configuration sets or TCI state sets) for the UE. The base station may configure a certain number of TCI states (e.g., TCI state indices) by using the higher layer signaling.

The base station may configure TCI state indices common to a plurality of TRPs. Therefore, an increase in amount of information about the higher layer signaling notified from the base station to the UE can be suppressed. Alternatively, the base station may separately (e.g., differently) configure TCI state indices for each of the plurality of the TRPs. Therefore, it is possible to flexibly perform a TCI state configuration for each TRP.

<Activation Indication by MAC CE>

When the number of candidates for TCI states configured by higher layer signaling is more than a certain value (e.g., 8), the base station may designate TCI state candidates for activation (or mapping to a certain field in DCI) for the UE by using one piece of MAC control information (see FIG. 5). The UE may determine the TCI state candidates activated in each TRP based on the MAC control information transmitted from the base station. Note that the activation may be interpreted as at least one of activation and deactivation, or deactivation.

FIG. 5 shows an example of a structure of MAC control information to support notification of TCI states corresponding to one or a plurality of TRPs. Here, a field (TCI state_i,0 (TRP #0)) to designate TCI states corresponding to a first TRP (e.g., TRP #0) and a field (TCI state_i,1 (TRP #1)) to designate TCI states corresponding to a second TRP (e.g., TRP #1) are included. TCI state_i,0 (TRP #0) and TCI state_i,1 (TRP #1) may be configured in different octets.

In FIG. 5, C_i,j corresponds to a field to designate the presence or absence of activation (or enabling) of TCI state ID_i,j. C_i,j and TCI state ID_i,j may be configured in different fields with the same octet.

i may correspond to an index (e.g., code point mapping order) of a DCI code point to which an activated TCI corresponds. j may correspond to a TRP (or a TRP index). For example, TCI state ID_i,j may correspond to TCI state i for TRP #j. N corresponds to the maximum number of TCI code points (or code points included in DCI) to be activated, and may be, for example, 8. A reserved bit (R) may be a certain number (e.g., 0).

When C_i,j is 0, the UE may determine that TCI state ID_i,j corresponding to TRP #j is not enabled (e.g., deactivated or disabled). In this case, notification of TCI states corresponding to TRP #j is unnecessary. When all TCI states corresponding to TRP #j are not enabled, the UE may determine that DL transmission (e.g., a PDSCH) is not scheduled in this TRP #j.

C_i,j corresponding to some TCI state IDs out of TCI state IDs for TRP #j may be configured to 0.

TCI state IDs corresponding to respective TRPs may be mapped to DCI code points. For example, TCI state ID_1,0 and TCI state ID_1,1 are mapped to a first code point (e.g., 0 (or 000)), and TCI state ID_2,0 and TCI state ID_2,1 are mapped to a second code point (e.g., 1 (or 001)).

The UE may determine, in the MAC control information, TCI states for each TRP for which activation or enabling is indicated by C_i,j and TCI states applied to DL transmission (e.g., a PDSCH) based on a code point designated by the DCI.

For example, when both C_i,0 and C_i,1 are activated or enabled, the UE may determine that TCI state #i corresponding to TRP #0 and TCI state #i corresponding to TRP #1 are applied. The UE may assume that the DL transmission is scheduled from both TRP #0 and TRP #1. Note that TCI state #i,0 corresponding to TRP #0 and TCI state #i,1 corresponding to TRP #1 may be a TCI state index commonly configured by higher layer signaling, or may be a TCI state index separately configured by higher layer signaling.

A specific TCI state out of TCI states configured by higher layer signaling may be designated by a field in which each TCI state ID_i,j is configured. TCI state #i,0 and TCI state #i,1 may be at least one TCI state out of the TCI states configured by the higher layer signaling. TCI state #i,0 (or TCI state #i,1) may designate one TCI state candidate by using a plurality of bits. Alternatively, TCI state #i,0 (or TCI state #i,1) may designate one TCI state candidate by using bit-map formats.

When either of C_i,0 or C_i,1 (e.g., C_i,0) is activated or enabled, the UE may assume that the DL transmission is scheduled from only TRP #0 (the DL transmission is not scheduled from TRP #1). The UE may determine that TCI state #i corresponding to TRP #0 is applied to the DL transmission.

Note that FIG. 5 shows a case where TRP indices are associated with TCI state indices, but the present disclosure is not limited to this. For example, only information indicating that which TRP of the two TRPs TCI state indices correspond to may be associated with the TCI state indices, instead of with TRP indices (see FIG. 6). In this case, TRP #0 may be the first TRP or one TRP, and TRP #1 may be the second TRP or another TRP. In this case, the UE may control the process for receiving without consideration of TRP indices themselves.

<TCI State Designation by DCI>

The base station may notify the UE of specific TCI state candidates by using DCI. For example, the UE determines, based on a code point notified by a certain field included in the DCI, TCI states notified from the base station (or each TRP).

The UE may determine, based on correspondence between TCI states and DCI code points activated by MAC control information, at least one of an TRP index at which the PDSCH is transmitted and the number of TRPs in which the PDSCH is transmitted. For example, when one TCI state corresponds to a code point designated by the DCI (when TCI states for either of the TRPs are disabled (C_i,j=0)), the UE may determine that a PDSCH is transmitted from one TRP. On the other hand, when two TCI states correspond to a code point designated by the DCI (when TCI states for both of the TRPs are enabled (C_i,j=1)), the UE may determine that PDSCHs are transmitted from two TRPs.

<Variations>

A structure in which whether or not one TRP of the two TRPs is activated or enabled is notified by MAC control information may be employed (see FIG. 7). FIG. 7 shows a structure to support notification of TCI states corresponding to one or a plurality of TRPs by using one piece of MAC control information.

In FIG. 7, C may designate whether an octet including a TCI state ID for one TRP of the two TRPs exists. In other words, TCI states to be always activated are configured for one TRP (here, the first TRP), and with respect to another TRP (here, the second TRP), the presence or absence of a TCI state configuration is controlled by a certain bit (C).

For example, when a certain field (C) included in octet 1 used for designation of TCI state 1,0 for the first TRP is a certain bit (e.g., 1), the UE may determine that octet 2 to designate a TCI state (here, TCI state_1,1) for the second TRP exists.

On the other hand, when the certain field (C) included in octet 1 used for the designation of TCI state_1,0 for the first TRP is another bit (e.g., 0), the UE may determine that octet 2 to designate the TCI state (here, TCI state_1,1) corresponding to the second TRP does not exist. In this case, the UE may assume that a TCI state (e.g., TCI state_1+i,0) for the first TRP is defined in octet 2, in place of TCI state_1,1.

When the certain field (C) included in octet 1 used for the designation of TCI state_1,0 for the first TRP is another bit (e.g., 0), the UE may also assume that DL transmission from the second TRP is not scheduled.

TCI state #i,0 and TCI state #i,1 may be at least one TCI state out of the TCI states configured by the higher layer signaling. TCI state #i,0 (or TCI state #i,1) may designate one TCI state candidate by using a plurality of bits. Alternatively, TCI state #i,0 (or TCI state #i,1) may designate one TCI state candidate by using bit-map formats.

Note that i may indicate an index of a code point to which an activated TCI corresponds (or an activated TCI state index). j may indicate which of correspondence to the first TRP or correspondence to the second TRP.

TCI state indices corresponding to respective TRPs may be mapped to DCI code points in certain order. For example, TCI state ID_1,0 and TCI state ID_1,1 are mapped to a first code point (e.g., 0 (or 000)), and TCI state ID_2,0 and TCI state ID_2,1 are mapped to a second code point (e.g., 1 (or 001)).

FIG. 7 shows a case where only information indicating that which TRP of the two TRPs the TCI state indices correspond to is associated with the TCI state indices, instead of with TRP indices.

On the other hand, a structure in which the TRP indices are associated with the TCI state indices is conceivable. In this case, either TRP (e.g., TRP #0) is always configured in a table, and the presence or absence of a configuration of an octet including TCI states for another TRP (e.g., TRP #1) is controlled by a certain bit (C). However, when TRP #0 is not scheduled, such structure requires that TCI states for TRP #0 and TRP #1 are always configured to notify the UE of the configuration.

Thus, as shown in FIG. 7, only the information indicating that which TRP of the two TRPs the TCI state indices correspond to is associated, and thus only TCI states corresponding to TRP #1 can be transmitted by being included in MAC control information even when TRP #0 is not scheduled. The UE may perform the process for receiving regardless of a TRP index at which DL transmission is scheduled (e.g., by determining the number of TRPs in which DL transmission is performed).

When DL transmission is scheduled from the two TRPs, the UE may perform the process for receiving based on designated TCI state indices (e.g., two TCI state indices) without acknowledging that which TCI state which TRP applies.

When PDSCHs are transmitted from the two TRPs, the UE may assume that one TCI state (e.g., a TCI state corresponding to the first TRP) of two TCI states corresponding to a certain DCI code point corresponds to a first PDSCH and the other TCI state (e.g., a TCI state corresponding to the second TRP) corresponds to a second PDSCH. In this case, the first PDSCH may correspond to a PDSCH with a smaller control resource set group index, and the second PDSCH may correspond to a PDSCH with a smaller control resource set group index.

As described above, when DL transmission is scheduled from the two TRPs, the correspondence between the two TCI states corresponding to the DCI code point and the PDSCHs is defined, and thus the UE can appropriately perform reception even when the UE does not acknowledge TRP indices.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

FIG. 8 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 9:
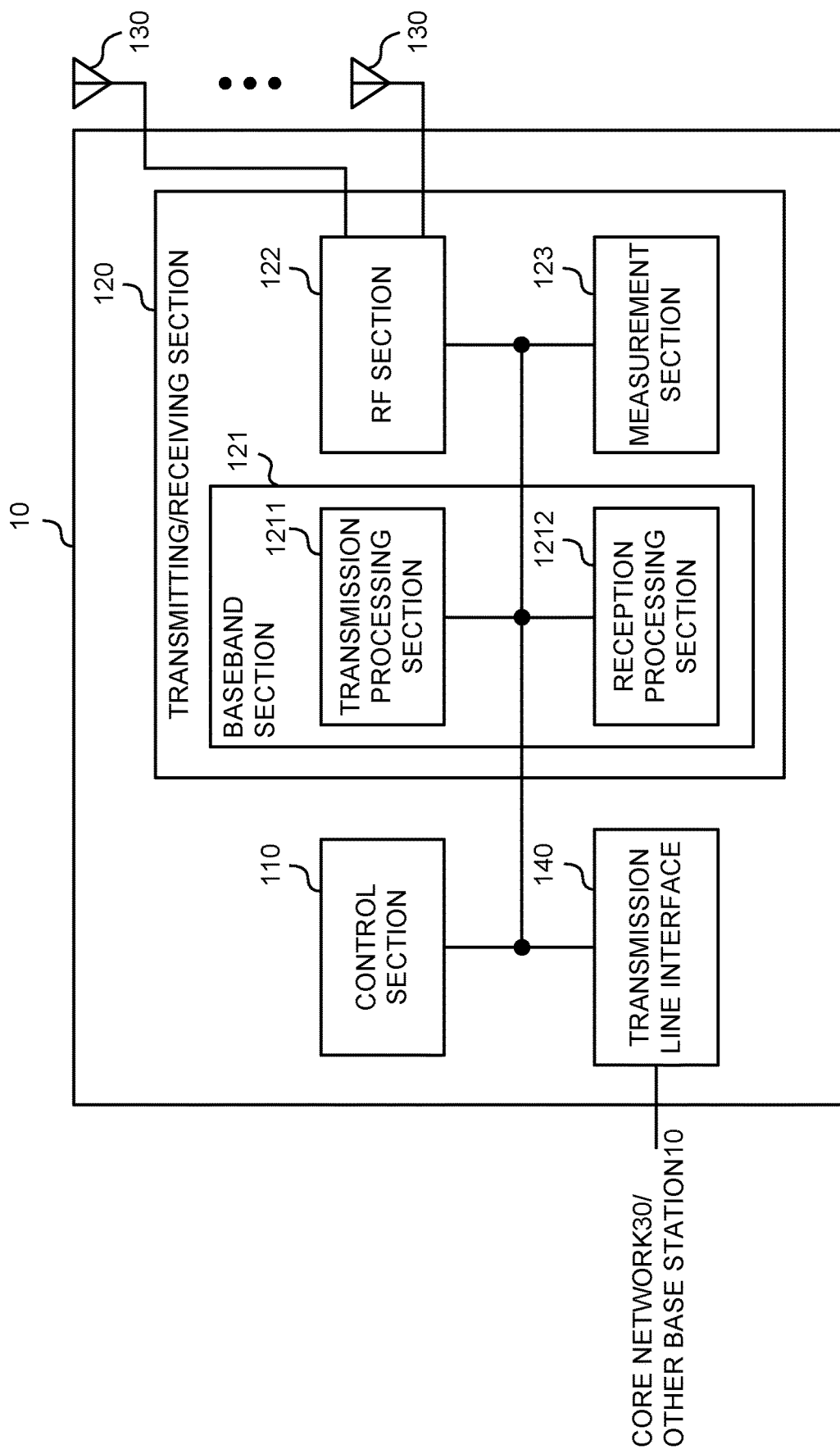
FIG. 9 is a diagram to show an example of a structure of a base station according to one embodiment.

FIG. 9 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit a plurality of pieces of first control information to indicate activation of TCI states respectively corresponding to transmission and reception points and second control information to designate a specific TCI state from activated TCI states.

Alternatively, the transmitting/receiving section 120 may transmit first control information to indicate activation of TCI states respectively corresponding to a plurality of transmission and reception points and second control information to designate a specific TCI state from activated TCI states.

The control section 110 may control so as to designate, based on a value of a specific field included in the first control information, a transmission and reception point to which a TCI state to be activated corresponds. Alternatively, the control section 110 may control so as to designate, based on a bit value included in the second control information, a TCI state used in one or a plurality of transmission and reception points.

(User Terminal)

Figure 10:
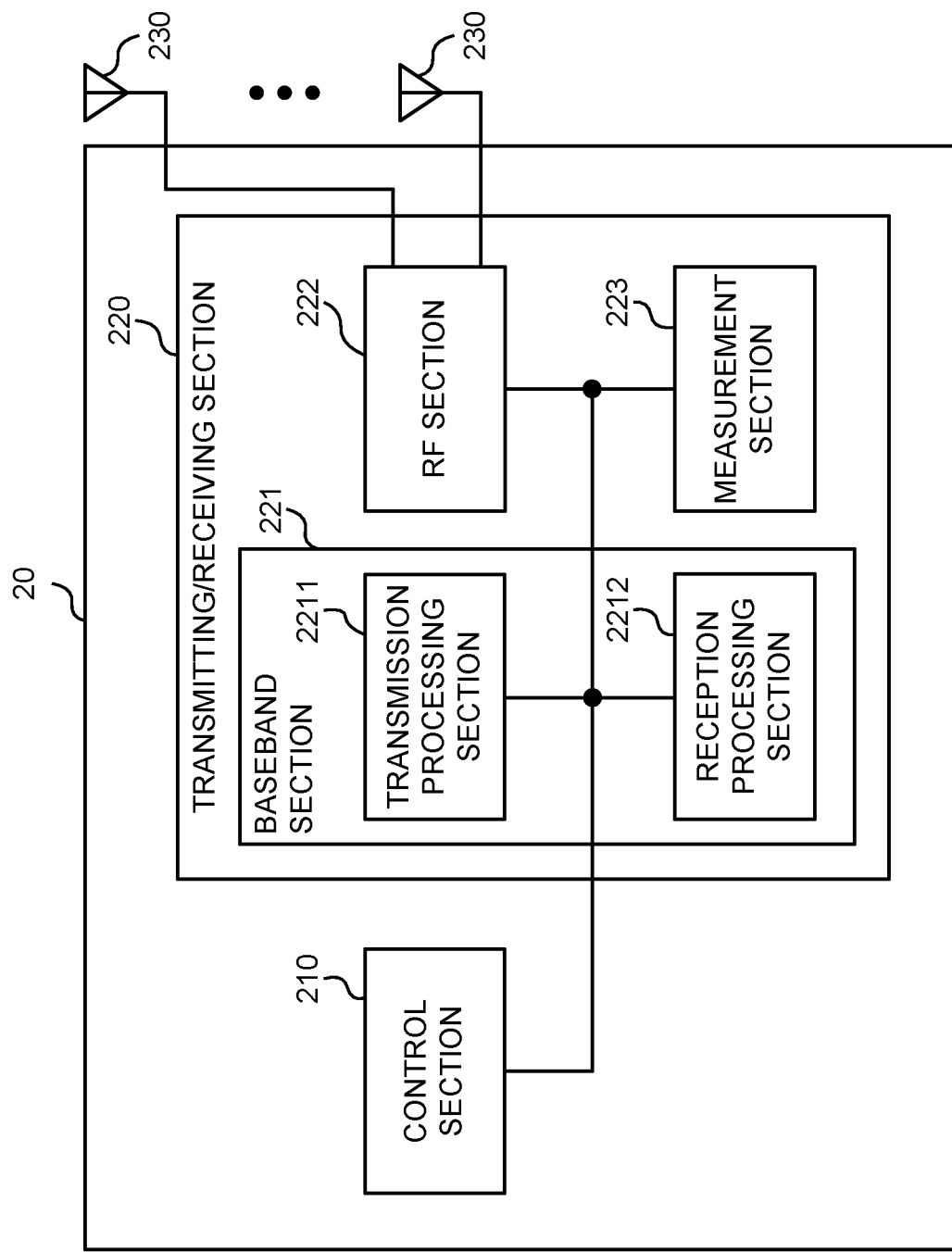
FIG. 10 is a diagram to show an example of a structure of a user terminal according to one embodiment.

FIG. 10 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive a plurality of pieces of first control information to indicate activation of TCI states respectively corresponding to each transmission and reception point and second control information to designate a specific TCI state from activated TCI states. The numbers of TCI states to be activated for the transmission and reception points are configurable differently.

Alternatively, the transmitting/receiving section 220 may receive first control information to indicate activation of TCI states respectively corresponding to a plurality of transmission and reception points and second control information to designate a specific TCI state from activated TCI states.

The control section 210 may determine, based on a value of a specific field included in the first control information, a transmission and reception point to which a TCI state to be activated corresponds.

Alternatively, the control section 210 may determine, based on a bit value included in the second control information, a TCI state used in one or a plurality of transmission and reception points. The control section 210 may also determine, based on a value of a specific field included in the first control information, the number of transmission and reception points corresponding to a bit value included in the second control information.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 11:
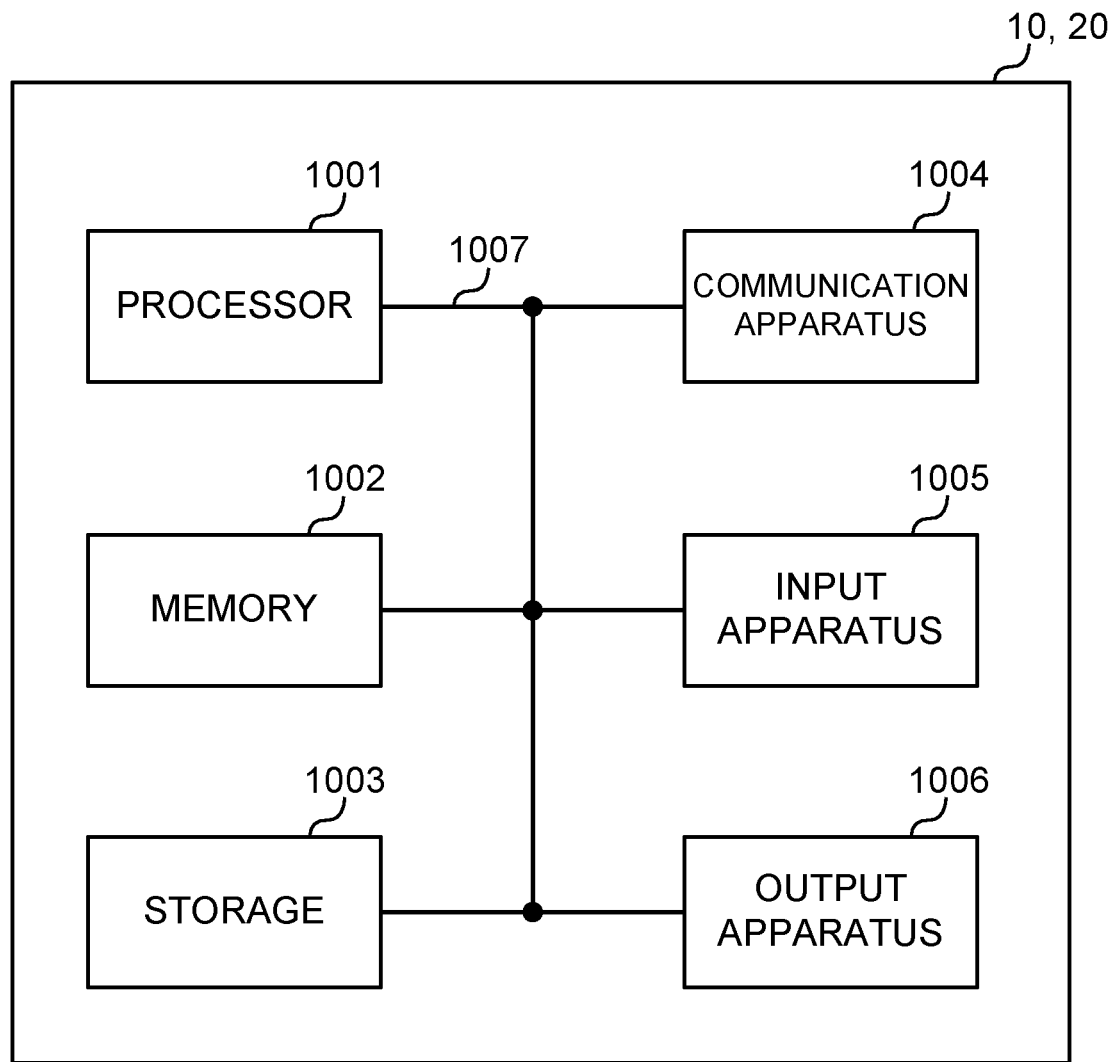
FIG. 11 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 11 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives first control information used for scheduling of one or more downlink shared channels and second control information indicating one or more transmission configuration indicator (TCI) states respectively corresponding to each code point of a first field included in the first control information; and
a processor that determines, based on a number of TCI states indicated by the first field included in the first control information, correspondence between the one or more downlink shared channels and the TCI states indicated by the first field,
wherein the second control information includes a second field that designates presence or absence of the TCI states.

2. The terminal according to claim 1, wherein when a first downlink shared channel and a second downlink shared channel are scheduled by the first control information, and a first TCI state and a second TCI state are indicated by the first field, the processor determines that the first TCI state corresponds to the first downlink shared channel and the second TCI state corresponds to the second downlink shared channel.

3. The terminal according to claim 1, wherein when a repetition transmission is applied to the downlink shared channel, and a first TCI state and a second TCI state are indicated by the first field, correspondence between a plurality of downlink shared channels included in the repetition transmission and the first TCI state and the second TCI state is defined.

4. The terminal according to claim 1, wherein when a first TCI state and a second TCI state are indicated by the first field, the first TCI state corresponds to a first code division multiplexing (CDM) group and the second TCI state corresponds to a second CDM group which is different from the first CDM group.

5. A radio communication method for a terminal, comprising:
receiving first control information used for scheduling of one or more downlink shared channels and second control information indicating one or more transmission configuration indicator (TCI) states respectively corresponding to each code point of a first field included in the first control information; and
determining, based on a number of TCI states indicated by the first certain field included in the first control information, correspondence between the one or more downlink shared channels and the TCI states indicated by the first field,
wherein the second control information includes a second field that designates presence or absence of the TCI states.

6. A base station comprising:
a transmitter that transmits first control information used for scheduling of one or more downlink shared channels and second control information indicating one or more transmission configuration indicator (TCI) states respectively corresponding to each code point of a first field included in the first control information; and
a processor that controls, based on a number of TCI states indicated by the first field included in the first control information, correspondence between the one or more downlink shared channels and the TCI states indicated by the first field,
wherein the second control information includes a second field that designates presence or absence of the TCI states.

7. A system comprising a terminal and a base station, wherein
the terminal comprises:
a receiver that receives first control information used for scheduling of one or more downlink shared channels and second control information indicating one or more transmission configuration indicator (TCI) states respectively corresponding to each code point of a first field included in the first control information; and
a processor of the terminal that determines, based on a number of TCI states indicated by the first field included in the first control information, correspondence between the one or more downlink shared channels and the TCI states indicated by the first field,
wherein the second control information includes a second field that designates presence or absence of the TCI states, and
the base station comprises:
a transmitter that transmits the first control information and the second control information; and
a processor of the base station that controls the correspondence between the one or more downlink shared channels and the TCI states indicated by the first field.

* * * * *